United States Patent
Yeh et al.

(10) Patent No.: US 11,651,588 B1
(45) Date of Patent: May 16, 2023

(54) OBJECT DETECTION METHOD AND CONVOLUTION NEURAL NETWORK FOR THE SAME

(71) Applicants: AETHERAI IP HOLDING LLC, Frisco, TX (US); NATIONAL TAIWAN UNIVERSITY HOSPITAL, Taipei (TW)

(72) Inventors: Chao-Yuan Yeh, Taipei (TW); Wen-Chien Chou, Taipei (TW); Cheng-Kun Yang, Taipei (TW)

(73) Assignees: AETHERAI IP HOLDING LLC; NATIONAL TAIWAN UNIVERSITY HOSPITAL, Taipei (TW)

( * ) Notice: Subject to any disclaimer, the term of this patent is extended or adjusted under 35 U.S.C. 154(b) by 522 days.

(21) Appl. No.: 16/970,628

(22) PCT Filed: Jun. 5, 2020

(86) PCT No.: PCT/US2020/036218
§ 371 (c)(1),
(2) Date: Aug. 18, 2020

(87) PCT Pub. No.: WO2021/247034
PCT Pub. Date: Dec. 9, 2021

(51) Int. Cl.
*G06V 10/82* (2022.01)
*G06T 3/40* (2006.01)
*G06V 10/77* (2022.01)

(52) U.S. Cl.
CPC ............ *G06V 10/82* (2022.01); *G06T 3/4046* (2013.01); *G06V 10/7715* (2022.01)

(58) Field of Classification Search
None
See application file for complete search history.

(56) References Cited

U.S. PATENT DOCUMENTS

| 9,739,783 | B1 | 8/2017 | Kumar et al. |
| 10,565,729 | B2* | 2/2020 | Vajda ............ G06N 3/084 |

(Continued)

FOREIGN PATENT DOCUMENTS

| CN | 109740652 A | 5/2019 |
| TW | 202008163 A | 2/2020 |

(Continued)

OTHER PUBLICATIONS

International Search Report and Written Opinion dated Aug. 18, 2020 in International Patent Application No. PCT/US2020/036218, filed on Jun. 5, 2020.

*Primary Examiner* — Anand P Bhatnagar
(74) *Attorney, Agent, or Firm* — Huan-Yi Lin

(57) ABSTRACT

Disclosed are an object detection method and a convolution neural network. The method is performed through hierarchical architecture of the CNN and includes extracting groups of augmented feature maps from an input image through a backbone and two other groups of feature maps, identifying positive and negative samples with an IOU-based sampling scheme to be proposals for foreground and background through a proposal-sampling classifier, mapping the proposals to regions on the groups of augmented feature maps through the region proposal module, pooling the regions to fixed scale feature maps based on ROI aligning, fusing the fixed scale feature maps, and flattening the fused feature maps to generate an ROI feature vector through an ROI aligner for object classification and box regression. Because extracted features in the groups of augmented feature maps range from spatially-rich features to semantically-rich features, enhanced performance in object classification and box regression can be secured.

38 Claims, 9 Drawing Sheets

(56) References Cited

U.S. PATENT DOCUMENTS

| | | | |
|---|---|---|---|
| 10,586,350 B2* | 3/2020 | Vajda | G06F 18/2137 |
| 10,692,243 B2* | 6/2020 | Vajda | G06V 10/764 |
| 10,733,431 B2* | 8/2020 | Zhang | G06N 7/00 |
| 11,526,723 B2* | 12/2022 | Yang | G06N 3/08 |
| 2018/0096457 A1* | 4/2018 | Sawides | G06V 10/764 |
| 2019/0171870 A1* | 6/2019 | Vajda | G06T 7/73 |
| 2019/0171871 A1* | 6/2019 | Zhang | G06V 40/103 |
| 2019/0171903 A1* | 6/2019 | Vajda | G06F 18/214 |
| 2019/0172223 A1* | 6/2019 | Vajda | G06V 10/764 |
| 2022/0157048 A1* | 5/2022 | Ting | G06T 19/20 |

FOREIGN PATENT DOCUMENTS

| | | |
|---|---|---|
| WO | 2019162241 A1 | 8/2019 |
| WO | 2020109016 A1 | 6/2020 |

\* cited by examiner

OBJECT DETECTION METHOD AND CONVOLUTION NEURAL NETWORK FOR THE SAME

BACKGROUND OF THE INVENTION

1. Field of the Invention

The present invention relates to a method and a neural network for object detection and, more particularly, to an object detection method using a convolution neural network (CNN) and a convolution neural network with enhanced hierarchical feature extraction architecture for object detection.

2. Description of the Related Art

Object detection technique can be adopted by diverse applications including fields of video surveillance, autonomous driving, transportation, medical image analysis, life and the like. How to identify and classify the objects in images seems to be a challenge job to unattended machines. Attributable to cutting-edge artificial intelligence (AI) technology, object identification and classification can be fulfilled in a way that has never been possible before.

Recent AI technologies involved with convolution neural network (CNN), such as R-CNN, Fast R-CNN, Faster R-CNN, Mask R-CNN, have been rolled out one after the other to constantly enhance object detection to the extent that each object in an image can be bounded by a box drawn around the object, predicted as a class with a confidence score or probability, and in certain cases like Mask R-CNN masked by a shape thereon with a contour matching that of the object. Despite the progress of object detection arising from those AI technologies, persistent pursuit of more and more demanding performance of objection detection in terms of accuracy of classification and anchor box regression inevitably appears to be a trend, particularly in certain fields like autonomous driving and the use of AI interpreting medical image because they can deliver speedy determination of road and driver's conditions and conditions of human tissues and organs. However, as it could be potentially fatal if anything goes wrong with the object detection results, precision of the object detection results is the name of the game and should be evolved with new technologies.

SUMMARY OF THE INVENTION

An objective of the present invention is to provide an object detection method and a convolution neural network (CNN) capable of extracting features from input images broadly ranging from spatial features to semantic features for enhancing accuracy in object classification and box regression of a proposal regardless of its size.

To achieve the foregoing objective, an object detection method using a convolution neural network (CNN), comprising:

extracting a group of first feature maps from an input image through a feature extractor, wherein the group of first feature maps are multi-scale;

propagating features from the group of first feature maps to generate a group of augmented feature maps through a group of second feature maps by scaling and adding corresponding portions of the groups of first, second and augmented feature maps, wherein the groups of second feature maps and augmented feature maps are multi-scale and are identical to the group of first feature maps in width and height; and pooling a region on each feature map of the group of augmented feature maps mapped from each of multiple proposals on the input image to a fixed size feature map, flattening the fixed size feature map to generate an ROI (Region of Interest) feature vector, and fusing the ROI feature vectors generated from the group of augmented feature maps to generate a fused ROI vector through an ROI aligner for object classification and anchor box regression The foregoing object detection method extracts features of the input image to generate the group of first feature maps and passes features to the group of augmented feature maps through the group of second feature maps to ensure that the group of augmented feature maps contain a combination of spatial features and semantic features passed from the group of first feature maps. Such combination of spatial features and semantic features in different portions of the group of augmented feature maps enhances performance in object classification and box regression. Regions in a portion of the group of augmented feature maps smaller in size can also possess sufficient spatial features or regions in a portion of the group of augmented feature maps larger in size can also possess sufficient semantic features. It is also noted that propagating the spatial features and semantic features to the groups of augmented feature maps only requires scaling operations and addition, which are simple and cost-effective ways to get the feature-extracting job done. The method then pools a region on each feature map of the group of augmented feature maps mapped from one of multiple proposals on the input image based on the ROI-aligning scheme to generate a fixed size feature map without misalignment as other ROI pooling schemes have. The method further flattens the fixed-scale feature maps generated from the group of augmented feature maps to generate an ROI feature vector and fuses the ROI feature vectors to generate a fused ROI vector for object classification and box regression. As a result of the processes that deliver diversified features to the group of augmented feature maps and accurately transform the features in the group of augmented feature maps to the flattened ROI feature vector for the final stage of object classification and box regression, the method significantly improves the performance in object classification and box regression.

To achieve the foregoing objective, a CNN for object detection includes a feature extractor and an ROI (Region of Interest) aligner.

The feature extractor is a backbone that receives an input image and generates multiple groups of feature maps.

The multiple groups of feature maps include a group of first feature maps, a group of second feature maps and a group of augmented maps that contain equal number of sub-groups. Each group of feature maps are multi-scale and corresponding sub-groups of feature maps in the multiple groups of feature maps are equal in scale. Features from the group of first feature maps are propagated by the feature extractor to generate the group of augmented feature maps through the group of second feature maps by scaling and adding corresponding sub-groups of the groups of first, second and augmented feature maps.

The ROI aligner pools a region on each feature map of the group of augmented feature maps mapped from each of multiple proposals on the input image to a fixed size feature map, flattens the fixed size feature map to generate an ROI feature vector, and fuses the ROI feature vectors generated from the groups of augmented feature maps to generate a fused ROI vector for object classification and anchor box regression.

According to the foregoing hierarchical architecture of the CNN, diversified features including spatial features and semantic features can be extracted by the feature extractor from the input image and passed from the groups of first and second feature maps to the group of augmented feature maps. Both the CNN and the above-mentioned method have the advantages of such combination of spatial features and semantic features in each sub-group of augmented feature maps and adopt the use of up-sampling, down-sampling and addition for enhanced feature extraction. Moreover, the ROI aligner simply does the task of accurately transforming a region on each feature map of the group of augmented feature maps mapped from one of multiple proposals on the input image to a fused ROI vector by virtue of the ROI-aligning scheme, and the flattening and fusing operations. Likewise, because of the hierarchical architecture that delivers diversified features to the group of augmented feature maps and accurately transforms the features from the group of augmented feature maps to the flattened ROI feature vector for the final stage of object classification and box regression, the CNN significantly improves the performance in object classification and box regression.

Other objectives, advantages and novel features of the invention will become more apparent from the following detailed description when taken in conjunction with the accompanying drawings.

DETAILED DESCRIPTION OF THE INVENTION

Figure 1:
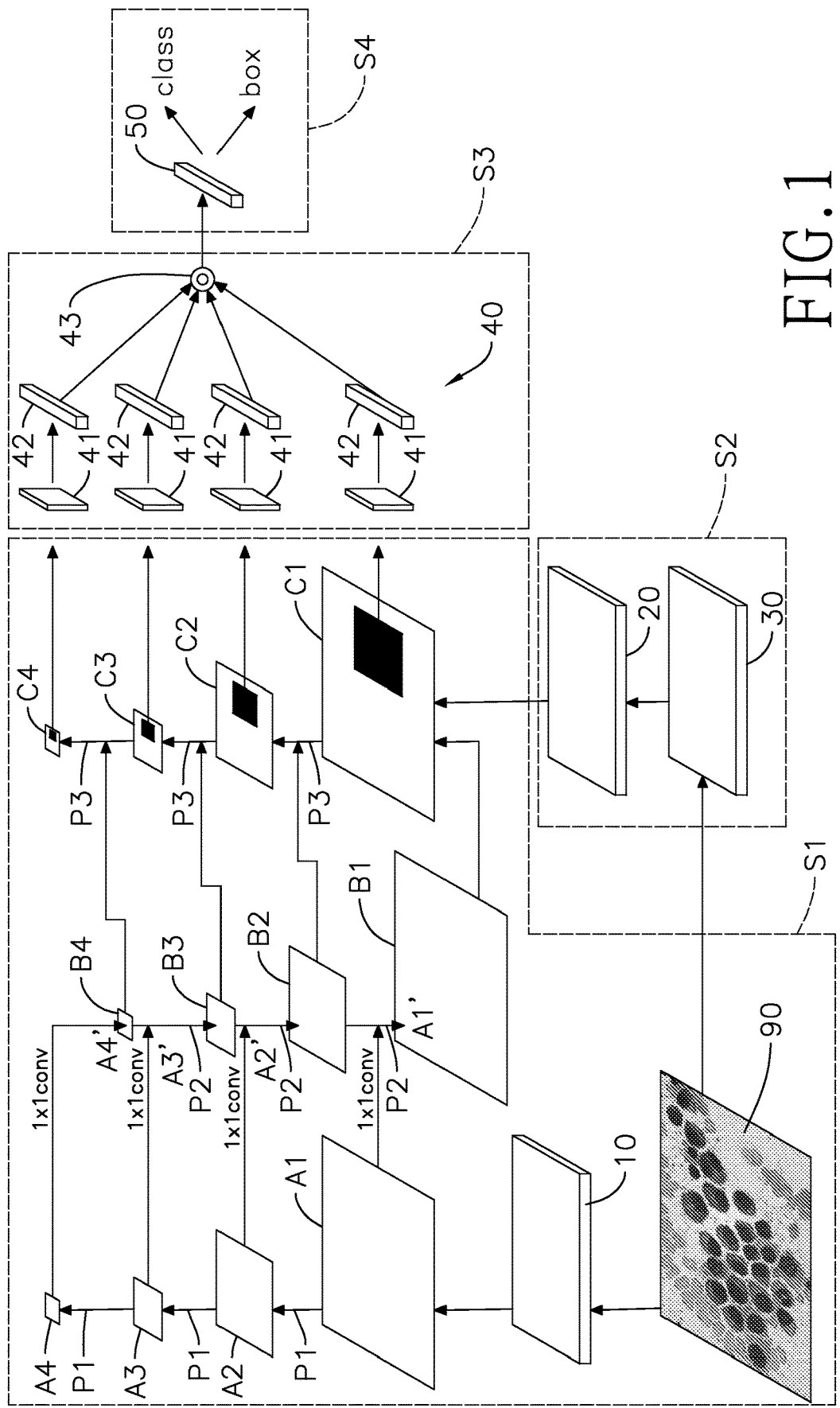
FIG. 1 is a schematic diagram showing a CNN trained upon forward propagation in accordance with the present invention.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The embodiments introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), graphics processing units (GPUs), etc.

The described embodiments concern one or more methods, systems, apparatuses, and computer readable mediums storing processor-executable process steps for training a convolution neural network to perform object detection and instance segmentation. In the embodiments, during the course of forward propagation in training a convolutional neural network (CNN), the CNN receives an image, generates a group of augmented feature maps, pools a region on a corresponding feature map of the group of augmented feature maps corresponding to a proposal or an ROI (region of interest) on the image to a fixed size feature map, flattens the fixed size feature map to an ROI feature vector, fuses the ROI feature vectors from the group of augmented feature maps to generate a fused ROI vector for object classification and anchor box regression. During the course of backpropagation in training the CNN, a localization loss scheme is applied as a measure of tackling the imbalance issue in the objective stage by suppressing the regression gradient contributed by outliers that are considered as hard samples and increasing the regression gradient contributed by inliers that are considered as easy samples.

Please note that the term 'scale' in the following description is referred to width×height×channel of an input image or multiple feature maps, and the term 'channel' means the depth or the number of feature maps associated with an input image or in a group/sub-group of feature maps. To be concise in description, only width and height are mentioned for up-sampling, down-sampling, and ROI-aligning while the channel remains unchanged.

According to the foregoing description, it appears that our focus in training the CNN falls in two categories, namely, forward propagation and backpropagation. The goal of the former category targets at enhancing the localization capability of the entire feature extraction hierarchy which contributes higher accuracy in predicting classes and anchor boxes associated with objects on the training image. The goal of the latter category is to promote the regression gradient as a result of the increased gradient of inliers. Implementations for fulfilling those goals are elaborated below.

To achieve the goal for forward propagation, as far as the architecture is concerned, with reference to FIG. 1, the CNN includes a feature extractor 10, a region proposal module 20, a proposal-sampling classifier 30, an ROI aligner 40, and a classification and regression module 50 arranged at different stages of the CNN.

Figure 2:
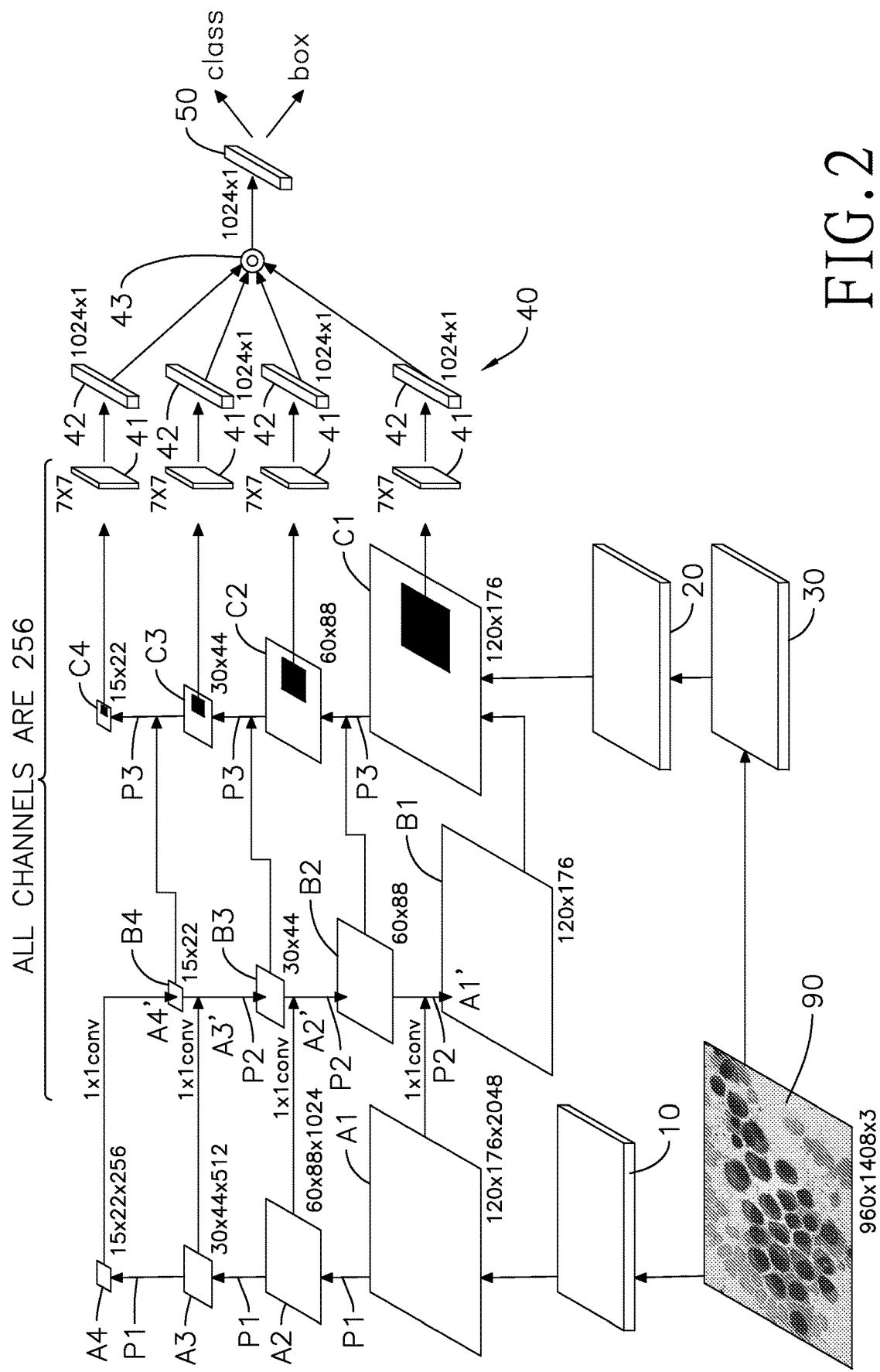
FIG. 2 is a schematic diagram of the CNN in FIG. 1 with size indication.

The feature extractor 10 is at a feature extraction stage S1 and is a backbone. The feature extractor 10 includes multiple convolution layers (filters) cascaded to each other, receives an input image 90, and extracts features from the input image 90 to generate multiple groups of feature maps. In one embodiment, the feature extractor 10 is Resnext 101 which is 101 layers deep, and can classify the input image 90 into multiple object categories. The multiple groups of feature maps include a group of first feature maps, a group of second feature maps and a group of augmented feature maps, and the three groups of feature maps include an equal number of sub-groups of feature maps. The sub-groups of first feature maps are represented by $A_1 \sim A_4$, the sub-groups of second feature maps are represented by $B_1$~$B_4$ and the sub-groups of augmented feature maps are represented by $C_1$~$C_4$ respectively located on a first path P1, a second path P2 and a third path P3 sequentially arranged in a forward propagation direction. The number of sub-groups in each group of feature maps includes but is not limited to four as shown in FIG. 1. Nevertheless, the numbers of the groups and sub-groups may be configured based on a design requirement of the CNN. Each sub-group of first feature maps $A_1$~$A_4$, second feature maps $B_1$~$B_4$ and augmented feature maps $C_1$~$C_4$ are identical in number of channel. The sub-groups of first feature maps $A_1$~$A_4$ are sequentially generated by the feature extractor 10 and are grouped by scale with all feature maps in each group of first feature maps $A_1$~$A_4$ identical in width and height across the channel thereof. The groups of first feature maps $A_1$~$A_4$ decrease in scale group by group along the first path P1. In general, the smaller the sub-group of first feature maps $A_1$~$A_4$ are, as a result of spatial pooling, the more semantic features and the less spatial features they have, and the larger the sub-group of first feature maps $A_1$~$A_4$ are, the less semantic features and the more spatial features they have. For example, A4, the smallest sub-group of first feature maps, have the most semantic features and the least spatial features while A1, the largest of first feature maps, have the least semantic features and the most spatial features. As indicated in FIG. 2, a non-limiting example for scale representation is shown. The three sub-groups of first feature maps $A_2$, $A_3$ and $A_4$ are one half in scale of the three sub-groups of first feature maps $A_1$, $A_2$ and $A_3$, respectively. Each sub-group of first feature maps, a corresponding sub-group of second feature maps, and a corresponding sub-group of augmented feature maps, for example, $A_1$, $B_1$ and $C_1$, are identical in width and height. The corresponding sub-groups of second and augmented feature maps $B_1$ and $C_1$ are identical in channel and differ from the sub-group of first feature maps $A_1$ in channel.

Figure 3:
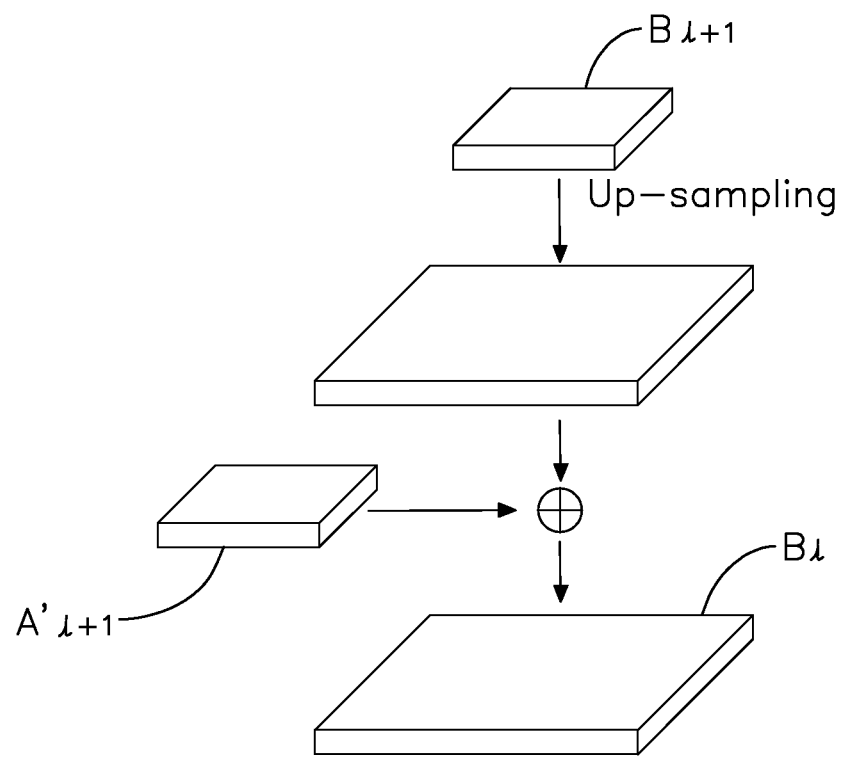
FIG. 3 is a schematic diagram showing up-sampling operation at a feature extraction stage for training the CNN in accordance with the present invention.
Figure 4:
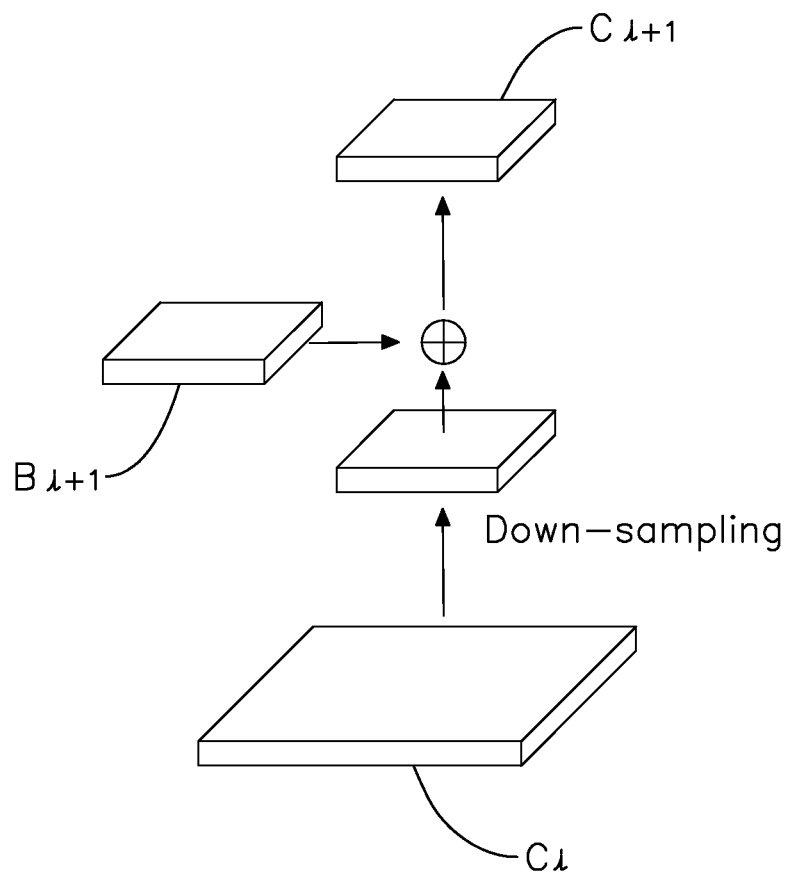
FIG. 4 is a schematic diagram showing down-sampling operation at the feature extraction stage in accordance with the present invention.

To take channel reduction migrating from the sub-groups of first feature maps $A_1$~$A_4$ to the sub-groups of second feature maps $B_1$~$B_4$ and the sub-groups of augmented feature maps $C_1$~$C_4$ into account, a 1×1 convolution can be applied to each sub-group of first feature maps $A_1$~$A_4$ to generate a channel-reduced group of first feature maps, which has multiple sub-groups $A_1'$~$A_4'$ identical to those of the sub-groups of first feature maps respectively in width and height. However, all the sub-groups of the channel-reduced group of first feature maps $A_1'$~$A_4'$ have a smallest channel chosen from the sub-groups of first feature maps $A_1$~$A_4$, which is common to the channel in the sub-groups of second feature maps $B_1$~$B_4$ and in the sub-groups of augmented feature maps $C_1$~$C_4$. After being generated, each channel-reduced sub-group of first feature maps $A_1'$~$A_4'$ is propagated to the second path P2. The sub-group of second feature maps $B_4$ first in the second path P2 is in fact $A_4'$, which is the smallest in scale relative to other channel-reduced sub-groups of first feature maps $A_1'$~$A_3'$. Each sub-group of second feature maps $B_4$, $B_3$, $B_2$ except the sub-group of second feature maps $B_1$ last in the second path P2 are up-sampled to match the scale of and then added to the channel-reduced sub-group of first feature maps $A_3'$, $A_2'$, $A_1'$ being larger than and nearest to the sub-group of second feature maps $B_4$, $B_3$, $B_2$ in scale to generate a subsequent sub-group of second feature maps $B_3$, $B_2$, $B_1$ in the second path P2. With reference to FIG. 3 showing the details of the up-sampling and the addition operation, the sub-group of second feature maps $B_{i+1}$ are up-sampled to match the channel-reduced sub-group of first feature maps $A_i'$, which are larger than and nearest to $B_{i+1}$ in scale, and are added to the channel-reduced sub-group of first feature maps $A_i'$ to generate a subsequent sub-group of second feature maps K. After being generated, the sub-group of second feature maps $B_1$ last in the second path P2 are propagated to the third path P3 and the sub-group of augmented feature maps $C_1$ first in the third path P3 are initialized to the sub-group of second feature maps $B_1$ last in the second path P2. Each sub-group of augmented feature maps $C_1$, $C_2$, $C_3$ except the sub-group of augmented feature maps $C_4$ last in the third path P3 are down-sampled to match the scale of the sub-group of second feature maps $B_2$, $B_3$, $B_4$ being smaller than and nearest thereto in scale to generate a subsequent sub-group of augmented feature maps $C_2$, $C_3$, $C_4$ in the third path P3 and then are added thereto. With reference to FIG. 4 showing the details of the down-sampling and the addition operation, the sub-group of augmented feature maps $C_i$ are down-sampled to be identical in scale to the sub-group of second feature maps $B_{i+1}$, which are less than and nearest to $C_i$ in scale, and are added to the sub-group of second feature maps $B_{i+1}$ to generate a subsequent sub-group of augmented feature maps $C_{i+1}$.

Figure 5:
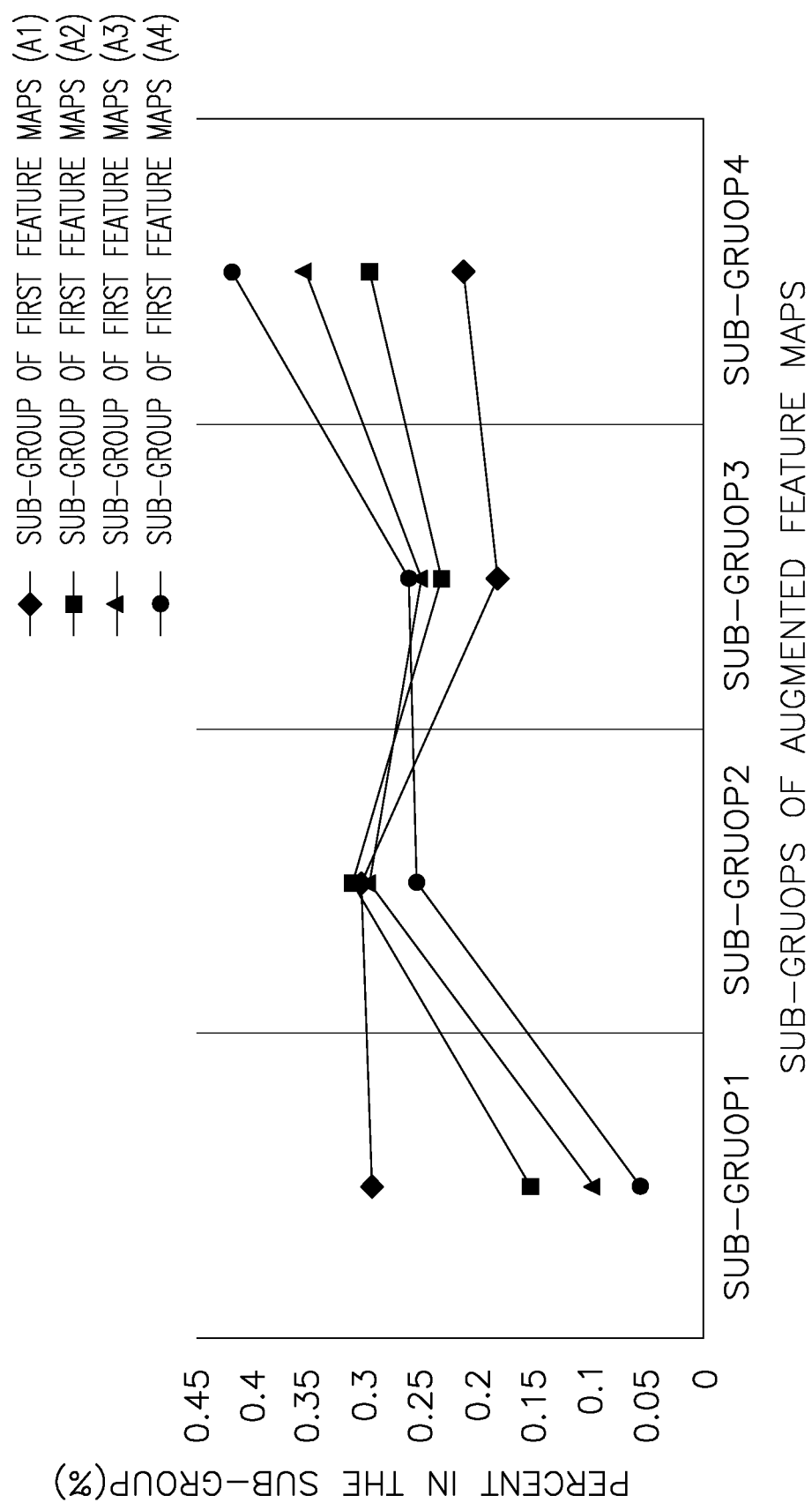
FIG. 5 is a curve diagram showing features in a group of augmented feature maps being features transferred from a group of first feature maps in accordance with the present invention.

After the convolution operation of the feature extractor 10, the sub-group of first feature maps $A_4$ with the smallest scale are the last to be generated. Because of the convolution effect, the low-level spatial features, such as edges, dots, and the like, in the sub-groups of first feature maps $A_1$~$A_4$ gradually decrease in quantity with the scales of the sub-groups of first feature maps $A_1$~$A_4$. On the contrary, the high-level semantic features, such as shapes, in the sub-groups of first feature maps $A_1$~$A_4$ gradually increase in quantity with the scales of the sub-groups of first feature maps $A_1$~$A_4$. Speaking of the scale reduction, one sub-group of first feature maps $A_2$~$A_4$ may be but not limited to be one half in scale of the sub-group of first feature maps $A_1$~$A_3$ most precedent thereto as shown in FIG. 2. Suppose we use the sub-group of first feature maps $A_4$ last in the first path P1 as an example. The sub-group of first feature maps $A_4$ have the sparsest spatial features than the rest of the sub-groups of first feature maps $A_1$~$A_3$. On the other hand, semantic features prevail most in $A_4$ than the rest sub-groups of first feature maps $A_1$~$A_3$. As being most deficient in spatial features, the last sub-group of first feature maps $A_4$ can result in higher localization error in anchor boxes for instance segmentation and unsatisfactory object classification result than any other sub-group of first feature maps $A_1$~$A_3$, if taken for object classification and box regression. To cope with the issue, in addition to the sub-groups of first feature maps $A_1$~$A_4$, the sub-groups of second feature maps $B_1$~$B_4$ and the sub-groups of augmented feature maps $C_1$~$C_4$ are brought into play for the purpose of sufficing low-level spatial features and high-level semantic features across all the sub-groups of augmented feature maps $C_1$~$C_4$. Technically, as no deep-layer convolution but 1×1 convolution, up-sampling, down-sampling, and addition are involved, it only introduces a tiny computational overhead in generation of the sub-groups of second feature maps $B_1$~$B_4$ and the sub-groups of augmented feature maps $C_1$~$C_4$. With the up-sampling and addition involved with the second path P2, the sub-group of second feature maps $B_3$ are generated based on features from the sub-group of first feature maps $A_3$ and the sub-group of second feature maps $B_4$ being equivalent to the sub-group of first feature maps $A_4$. Similarly, the sub-group of second feature maps $B_2$ are generated based on features from the sub-groups of first feature maps $A_2$, $A_3$, $A_4$, and the sub-group of second feature maps $B_1$ are generated based on the sub-groups of first feature maps $A_1$~$A_4$. With the down-sampling and addition involved with the third path P3, the sub-group of augmented feature maps $C_2$ are generated based on features from the sub-group of second feature maps $B_2$ whose features comes from the sub-groups of first feature maps $A_2$, $A_3$, $A_4$ and the sub-group of augmented feature maps $C_1$. The sub-group of augmented feature maps $C_1$ are further equivalent to the sub-group of second feature maps $B_1$ whose features comes from the sub-groups of first feature maps $A_1$~$A_4$. Overall, the sub-group of augmented feature maps $C_2$ are generated based on features from all the sub-groups of first feature maps $A_1$~$A_4$. Similarly, the sub-groups of augmented feature maps $C_3$, $C_4$ are all generated based on features from all the sub-groups of first feature maps $A_1$~$A_4$. Although each sub-group of augmented feature maps $C_1$~$C_4$ acquire features from the sub-groups of first feature maps $A_1$~$A_4$, the features contained therein may vary from one another due to features rearranged upon the down-sampling and the up-sampling. With reference to FIG. 5, the SUB-GROUPS 1-4 indicated on the horizontal axis correspond to the respective four sub-groups of augmented feature maps $C_1$~$C_4$ and the percent (%) indicated on the vertical axis represents the percent of features in each sub-group of augmented feature maps $C_1$~$C_4$ coming from each sub-group of first feature maps $A_1$~$A_4$. What FIG. 5, which is generated based on training data, intends to convey is that features in each sub-group of augmented feature maps $C_1$~$C_4$ is a combination of features extracted from all four sub-groups of first feature maps $A_1$~$A_4$. The feature extractor 10 ensures that the sub-groups of augmented feature maps $C_1$~$C_4$ acquire features spread across the sub-groups of first feature maps $A_1$~$A_4$, meaning that for each sub-group of augmented feature maps $C_1$~$C_4$, besides semantic features contained therein, spatially-rich details extracted from the sub-group of first feature maps, such as $A_1$, can be made available to complement features of larger objects contained in $C_1$~$C_4$ while besides spatial features contained therein, semantically-rich features extracted from the sub-group of first feature maps, such as $A_4$, can be made available to complement features of smaller objects contained in $C_1$~$C_4$.

The region proposal module 20 at a proposal-sampling stage S2 serves to map each of multiple anchor boxes on the input image 90 to corresponding regions on the feature maps of the sub-groups of augmented feature maps $C_1$~$C_4$, classify whether the anchor box is related to foreground or background, and tune the anchor box to generate a proposal (ROI) on the input image 90. The regional proposal module 20 classifies at least one ground-truth object bounded by the multiple anchor boxes as foreground when determining that the ground-truth object is contained in corresponding anchor boxes or background when determining that nothing is present in the corresponding anchor boxes. In one embodiment, the at least one ground-truth object includes one ground-truth object which is one of a person, an animal or a vehicle. In another embodiment, the at least one ground-truth object in the input image 90, a view of a bone marrow smear, includes multiple ground-truth objects. Each of the multiple ground-truth objects in the input image of bone marrow smear is classified into one of 14 types of cells, namely, blast, promyelocyte, myelocyte, metamyelocyte, polymorphonuclear (PMN) cell, eosinophil-and-precursor, basophil, monocyte-and-precursor, lymphocyte, plasma-cell, erythroid cell, histiocyte, mitotic cell, and other cell. For diagnosis purpose, the input image needs to have at least 500 cells, summing up all the 14 types of cells except for the mitotic cell and other cell. A bone marrow examination using the 14 types of cells model is sufficient for basic pathologic analysis of samples of bone marrow. To perform advanced pathologic analysis of bone marrow associated with specific bone marrow disorders, each of the multiple ground-truth objects in the input image of bone marrow smear needs to be classified into one of 33 types of cells, namely, blast, promyelocyte, myelocyte, metamyelocyte, neutrophilic-band, segmented-neutrophil, eosinophil-and-precursor, basophil, cell with Auer rods, dysplastic-granulocyte, monocyte-and-precursor, mature-lymphocyte, atypical-lymphocyte, plasma cell, hairy cell, proerythroblast, basophilic-erythroblast, polychromatophilic-erythroblast, orthochromatic-erythroblast, dysplastic-erythroblast, histiocyte, mast cell, megakaryocyte-precursor, mature-megakaryocyte, dysplastic-megakaryocyte, mitotic cell, osteoblast, osteoclast, fibroblast, megakaryocytic emperipolesis, hemophagocytic cell, metastatic-tumor cell, and invalid cell. For diagnosis purpose, when applying 33 types of cells model, the input image needs to have at least 500 cells, summing up all 33 types of cells, except the mast cell, cells with Auer rods, megakaryocyte-precursor, mature-megakaryocyte, dysplastic-megakaryocyte, mitotic cell, osteoblast, osteoclast, fibroblast, megakaryocytic emperipolesis, hemophagocytic cell, metastatic-tumor cell and invalid cell. For information, the other cell in 14 types of cells model corresponds to the following types of cells in 33 types of cells model: mast-cell, cells with Auer rods, megakaryocyte-precursor, mature-megakaryocyte, dysplastic-megakaryocyte, osteoblast, osteoclast, fibroblast, megakaryocytic emperipolesis, hemophagocytic-cell, metastatic-tumor-cell, and invalid cell. The invalid cell is essentially a blood cell but fails to be classified due to its deformation or indecent staining effect. Thus, the invalid cell type of cells includes smudge cell, cell with poor smear quality, and unknown.

As pertaining to conventional techniques and uncorrelated to the subject of the present invention, the regional proposal module 20 is not further elaborated here.

Being a supplementary role to proposal sampling, the proposal-sampling classifier 30 is addressed to get rid of the issue of sampling too many easy negative proposals for background when a random sampling approach is adopted. To that end, it in turn provides an effective sampling method to sample more hard negative proposals than random sampling, aiding the task of the region proposal module 20. In general, hard negative proposals arise from an insignificant overlap degree between an anchor box or sample and a corresponding ground-truth object, which is difficult for the sample to be judged as a negative proposal or a proposal for background. Intersection over Union (IOU), which is also called Jaccard index, is an evaluation metric usually adopted to measure the overlap degree of two regions. It is estimated that in reality more than 60% hard negative samples have an IOU value greater than 0.05, and what random sampling can achieve is just 30% for hard negative sample. In particular, the random sampling tends to sample excessive negative samples at the IOU value zero. The reason why we put on emphasis on hard negative proposals is because by and large negative samples overwhelm positive proposals in number. Thus, how to identify various negative samples appears to be a critical job for accurate object classification. As a countermeasure, the region proposal module 20 employs an IOU-based sampling approach and uniformly samples a configurable number of multiple anchor boxes in each of multiple equally-divided and configurable sampling intervals. The sampled anchor boxes overlap corresponding ground-truth objects with the IOU values over a negative IOU range which is greater than or equal to zero and less than a negative IOU threshold as the proposals for background. In one embodiment, the negative IOU threshold is 0.3. In contrast to the probability of each negative sample p selected by the random sampling approach, in which p=N/M where N is the number of negative samples and M is the total number of samples, the probability of each negative sample $P_l$ selected by the region proposal module 20 in a sampling interval l can be defined as follows:

$$P_l = \frac{N}{L} * \frac{1}{M_l}, l \in [0, L) \quad (1)$$

where

L is the number of sampling intervals equally-divided from the negative IOU range;

N is the number of demanded negative samples from the sampling interval l;

$M_l$ is the total number of negative samples in the sampling interval l.

Figure 6:
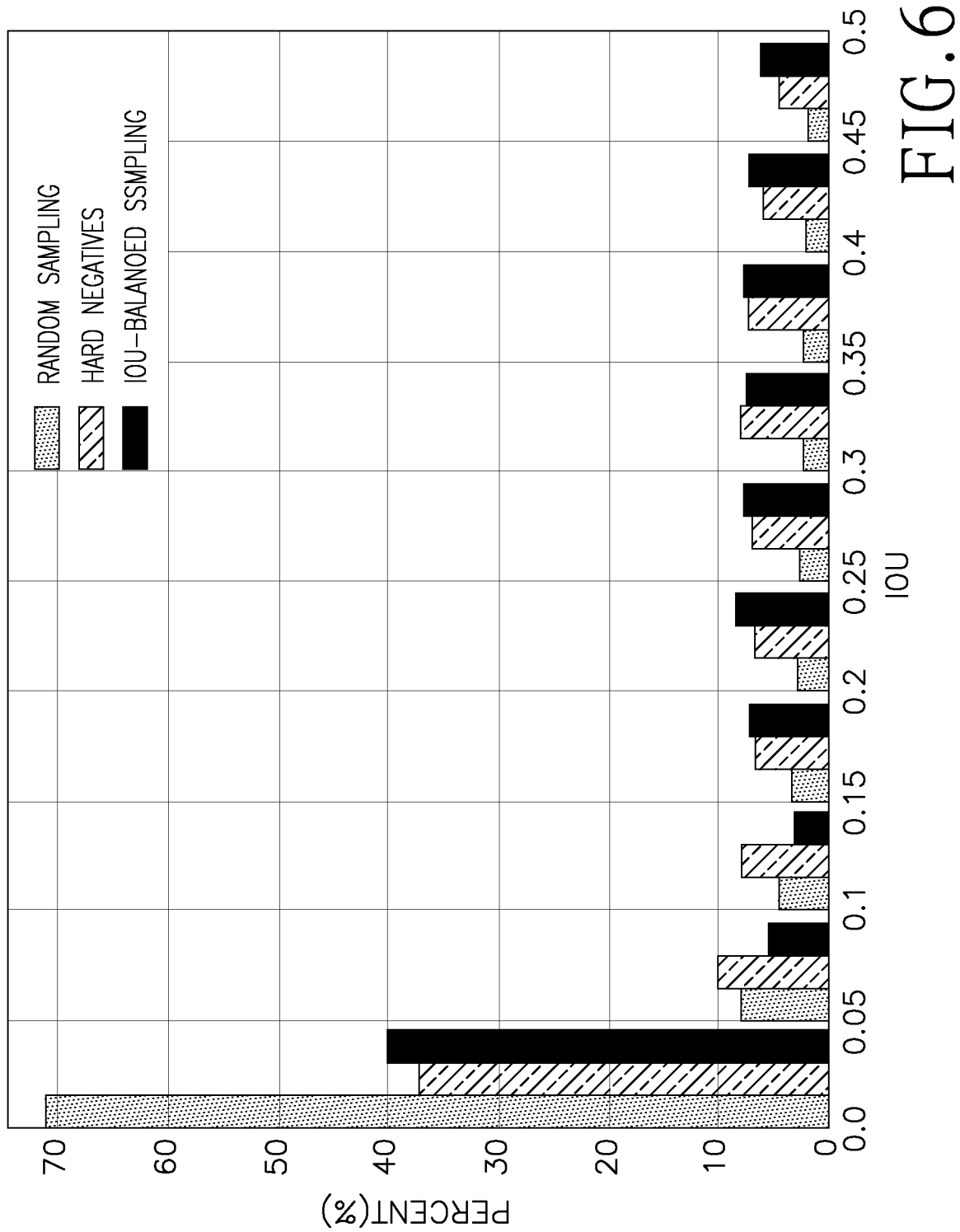
FIG. 6 is a bar chart showing hard negative proposals sampled by the present invention and random sampling.

The philosophy of the IOU-based sampling resides in mandatorily selecting a fixed number of proposals in an equally-divided and finer interval within the negative IOU range for assurance of even and comprehensive sampling throughout the entire negative IOU range. With reference to FIG. 6, the sampling results from experiments done by the random sampling and the hard negative sampling indicative of actual negative sample distribution are included for comparison with those of the IOU-based sampling addressed by the present invention. However, what FIG. 6 shows is just for exemplification and not for limitation. In one embodiment of our training, the negative IOU range is set to be greater than or equal to 0 and less than 0.3, L is assigned to be 10, and the sampling intervals 0~9 correspond to 0~0.03, 0.03~0.06, 0.09~0.12, . . . , and 0.27~0.3 respectively. To facilitate understanding of equation (1), for example, Mo is the total proposal number of in the sampling interval 0 (0~0.03), and $P_0$ is the probability of each negative proposal selected in the sampling interval 0. As revealed from FIG. 6, performance of the IOU-based sampling in identifying hard negative proposals is close to that of the typical hard negative sampling and thus mitigates excessive easy negative proposals sampled by the random sampling at the IOU value zero. Owing to less complication and low effort involved in raising the number of hard negative proposals to be detected, the IOU-based sampling provided by the proposal-sampling classifier 30 is a cost-effective way in favor of later object classification. However, besides the introduced generalized IOU algorithm, any other option, such as dice coefficient algorithm, capable of delivering the same functions of the generalized IOU algorithm can be also employed.

In consideration of balanced sampling for both negative and positive samples, ideally, the proposal-sampling classifier 30 can also take sampling of positive samples into account. As there are usually not so many ground-truth objects available in the training image, the number of positive samples may not be as sufficient as that done by the above-mentioned sampling for the negative samples. Nevertheless, with a different approach adopted for sampling the positive samples, the proposal-sampling classifier 30 samples an equal number of the multiple anchor boxes overlapping each of the at least one ground-truth object with an IOU value as the proposals for foreground. The IOU value is larger than a positive IOU threshold and less than or equal to one. In one embodiment, the positive IOU threshold is 0.7. The balanced sampling of positive and negative samples ensures that the chance of incorrectly classifying the proposals for foreground, which are for background supposedly, and the other way around, as performed in random sampling can be significantly lowered. Please be aware that the proposal-sampling classifier 30 is dedicated to the training only. After the CNN is done with the training and a model for prediction is generated, the proposal-sampling classifier 30 is not involved as a part of the CNN.

With further reference to FIG. 1, the ROI aligner 40 at an ROI alignment stage S3 includes multiple ROI align layers 41, multiple fully-connected ROI layers 42, and a fusion layer 43. The multiple ROI align layers 41 and the multiple fully-connected ROI layers 42 correspond to the sub-groups of augmented feature maps $C_1$~$C_4$ in number. For example, when there are four sub-groups of augmented feature maps $C_1$~$C_4$, the multiple ROI align layers 41 includes four ROIs align layers 41 and the multiple fully-connected ROI layers includes four fully-connected ROI layers 42. Each of the multiple ROI align layers 41 is substantially a pooling layer which performs a pooling operation on regions on the feature maps of a corresponding sub-group of augmented feature maps $C_1$~$C_4$ mapped by the region proposal module 20 from each proposal on the input image 90 at the proposal-sampling stage S2. In one embodiment, the pooling operation is max pooling. Unlike ROI pooling, the ROI align layers 41 performs data pooling without using quantization but using floating-point arithmetic instead. Naturally, the feature maps in the sub-groups of augmented feature maps $C_1$~$C_4$ take the form of a grid with the values of features, such as colors, at corresponding cells of the grid whose columns and rows of corners are expressed by integers. However, the coordinates of proposal on the input image 90 are expressed by floating-point numbers. As a result, for avoidance of the misalignment in coordinates caused by the use of the cells expressed in the form of integer, the coordinates including four corners of the portion on each feature map of the sub-groups of augmented feature maps $C_1$~$C_4$ mapped by a corresponding proposal (ROI) on the input image 90 are thus calculated in the form of floating-point numbers or real numbers. Conventionally, mapping a proposal to the feature maps is done by the region proposal module 20. The multiple ROI align layers 41 additionally function to pool the regions on the feature maps of the respective sub-groups of augmented feature maps $C_1$~$C_4$ to fixed-scale feature maps. To generate the fixed-scale feature maps, the dimensions of the multiple ROI align layers 41 are set to be the same size as those of the fixed-scale feature maps, which is N×N. The region on each feature map of each sub-group of augmented feature maps $C_1$~$C_4$ mapped from one of the proposals is then divided into multiple cells according to the dimension of the ROI align layer 41. Each cell in the region is assigned with multiple intermediate points located therein and horizontally and vertically spaced apart from each other and apart from the boundary of the cell by a gap of width/N and height/N, which are floating-point numbers respectively. The value of a feature at each intermediate point can be calculated by way of bilinear interpolation using the values of features at four cells of the grid of the feature map that are most proximate to the intermediate point. After the values of features at the intermediate points inside the cell are calculated, if max pooling is employed, a maximum value of a feature at one of the intermediate points is placed in a corresponding cell of one of the ROI align layers 41 according to the location of the cell on the region of the feature map mapped by the proposal. For example, in the case of the cell at the element (1, 2) of the divided cells of the region on the feature map, the pooled value associated with the cell is placed in the element (1, 2) of a corresponding ROI align layer 41. Depending on the number of channel M, after the pooling operation of each ROI align layer 41 is finished, N×N×M fixed-scale feature maps can be generated from each sub-group of augmented feature maps $C_1$~$C_4$ for each proposal. Each fully-connected ROI layer 42 then flattens the fixed-scale feature maps generated from a corresponding sub-group of augmented feature maps $C_1$~$C_4$ to generate a ROI feature vector. The fusion layer 43 fuses the ROI feature vectors flattened by the multiple fully-connected ROI layers 42 to generate a fused ROI vector.

With further reference to FIG. 1, the classification and regression module 50 at a classification and regression stage S4 performs object classification and anchor box regression for each of the multiple proposals associated with a corresponding fused ROI vector. As to the object classification, the classification and regression module 50 determines whether each proposal is foreground or background, and further predicts a class of a ground-truth object in the proposal, if foreground, with a confidence score attached as well to indicate the likelihood that the proposal contains the object. Meanwhile, the anchor box regression is performed for the ground-truth objects for the proposals to be better fitted in the respective anchor boxes for the proposals. As being well-known to persons having ordinary skills in the art, the details of the classification and regression module 50 are not elaborated.

Given below is an example depicting operation involved in training the CNN during forward propagation for detecting cells in an input image 90 generated from a bone marrow smear.

The forward propagation starts with the feature extraction stage. The scale of the input image 90 is determined by width, height and channel, which are referred to the pixel resolution of the input image and the RGB values of the pixels. In our case, the size of the training image is 1408×960×3 with 1408×960 and 3 indicative of the pixel resolution and three RGB colors of pixel in the input image 90. With further reference to FIG. 2, the input image is passed in the feature extractor 10, which is ResNext 101, and the feature extractor 10 outputs four sub-groups of first feature maps $A_1$~$A_4$ in the first path P1 and the scale are 176×120×2048, 88×60×1024, 44×30×512, and 22×15×256 respectively. It means that the sub-groups of first feature maps $A_1$~$A_4$ are multi-scale and the feature maps in each sub-group of first feature maps $A_1$~$A_4$ are identical in scale. As indicated by the scale, $A_1$ is one half of $A_2$ in width or height. Likewise, the half width/height reduction is also applied to the consecutive two sub-groups of first feature maps $A_2$ and $A_3$, and $A_3$ and $A_4$. As a measure of reducing computation overhead due to large number of channel, 1×1 convolution is applied to each sub-group of first feature maps $A_1$~$A_4$ to reduce the channels thereof to the lowest channel of $A_4$, which is 256, and the reduced-channel sub-groups of first feature maps $A_1'$~$A_4'$ are generated and propagated to the second path P2. After $A_4'$ is propagated to the second path P2 and the sub-group of second feature maps $B_4$ first in the second path is initialized to be $A_4'$ with the scale of 22×15×256, $B_4$ is up-sampled by an up-sampling factor 2 to be identical in scale to $A_3'$, which has a nearest larger scale, 44×30×256, relative to $B_4$, and is added to $A_3'$ to generate the subsequent sub-group of second feature maps $B_3$ whose scale is 44×30. By applying similar up-sampling and addition to $B_3$ and $A_2'$ as well as $B_2$ and $A_1'$, the sub-groups of second feature maps $B_2$ and $B_1$ whose scales are 88×60×256 and 176×120×256 respectively can be generated.

The sub-group of second feature maps $B_1$ are further propagated to the third path P3 and the sub-group of augmented feature maps $C_1$ first in the third path P3 is initialized to be the sub-group of second feature maps $B_1$ with the scale 176×120×256. $C_1$ is down-sampled by a down-sampling factor 2 to be identical in scale to the sub-group of second feature maps $B_2$, which has a nearest smaller scale, 88×60×256, relative to $C_1$, and is added to $B_2$ to generate the subsequent sub-group of second feature maps $C_2$ whose scale is 88×60×256. By applying similar down-sampling and addition to $C_2$ and $B_3$ as well as $C_3$ and $B_4$, the sub-groups of augmented feature maps $C_3$ and $C_4$ whose scales are 44×30×256, and 22×15×256 can be generated respectively. As the up-sampling and down-sampling only scale width and height, the channel of the sub-groups of second feature maps $B_1$~$B_4$ and the sub-groups of augmented feature maps $C_1$~$C_4$ remains to be 256. The feature maps in each sub-group of second and augmented feature maps $B_1$~$B_4$ and $C_1$~$C_4$ are equal in width and height.

The proposal classification stage S2 kicks off after the feature extraction stage S1 ends. Supposing that the negative IOU range is 0.3 and is divided into 10 sampling intervals, the number of demanded negative samples is 10 for each sampling interval greater than or equal to 0 and less than 0.3, and the number of demanded positive samples is 3 for each sampling interval greater than 0.7 and less than or equal to 1.0. The proposal-sampling classifier 30 then samples 10 anchor boxes overlapping corresponding cells with the IOU values in each of the sampling interval, 0~0.03, 0.03~0.06, 0.06~0.09, . . . , and 0.27~0.3 as the proposals for background. Besides the sampling of negative samples, the proposal-sampling classifier 30 samples 3 anchor boxes overlapping each cell with an IOU value larger than 0.7 and less than or equal to one as the proposals for foreground.

One proposal whose size is 128×128 on the input image 90 is given as an example for mapping the proposal to regions on the respective sub-groups of augmented feature maps $C_1$~$C_4$, which are 16×16, 8×8, 4×4, and 2×2 respectively on the feature maps of $C_1$~$C_4$ mapped by region proposal module 20.

The ROI alignment stage S3 follows the proposal classification stage S2. When the four ROI align layers 41 of the ROI aligner 40 pools are four 7×7 pooling layers, the four ROI align layers 41 pool the regions irrespective of any size of 16×16, 8×8, 4×4 or 2×2 on the feature maps of the sub-groups of augmented feature maps $C_1$~$C_4$ based on the ROI-aligning scheme to generate four groups of feature maps with a fixed scale of 7×7×256. The four fully-connected ROI layers 42 then flatten the respective groups of 7×7×256 feature maps into four ROI feature vectors whose size is, for example, 1024×1. The fusion layer 43 fuses the four ROI feature vectors into a fused ROI vector whose size is 1024×1.

At the end of forward propagation, the classification and regression stage S4, the classification and regression module 50 predicts a class of the cells in each proposal with a confidence score attached and performs anchor box regression to adjust the anchor box bounding the cell to a nearest size of the cell based on the fused ROI vector.

When the model trained according to the elements in the CNN, the AJI (Aggregated Jaccard Index) score, an index for assessing performance in instance segmentation, is taken by us as a measure of performance between the present invention and Mask R-CNN, which can be considered as the latest AI technology for object detection. As a general rule, the higher the AJI score reaches the better the performance associated therewith is. Under the condition of same nucleus segmentation datasets for training and prediction, our experiments show that the AJI score achieved by the present invention is 0.62 which outperforms 0.56 achieved by Mask R-CNN.

Figure 7:
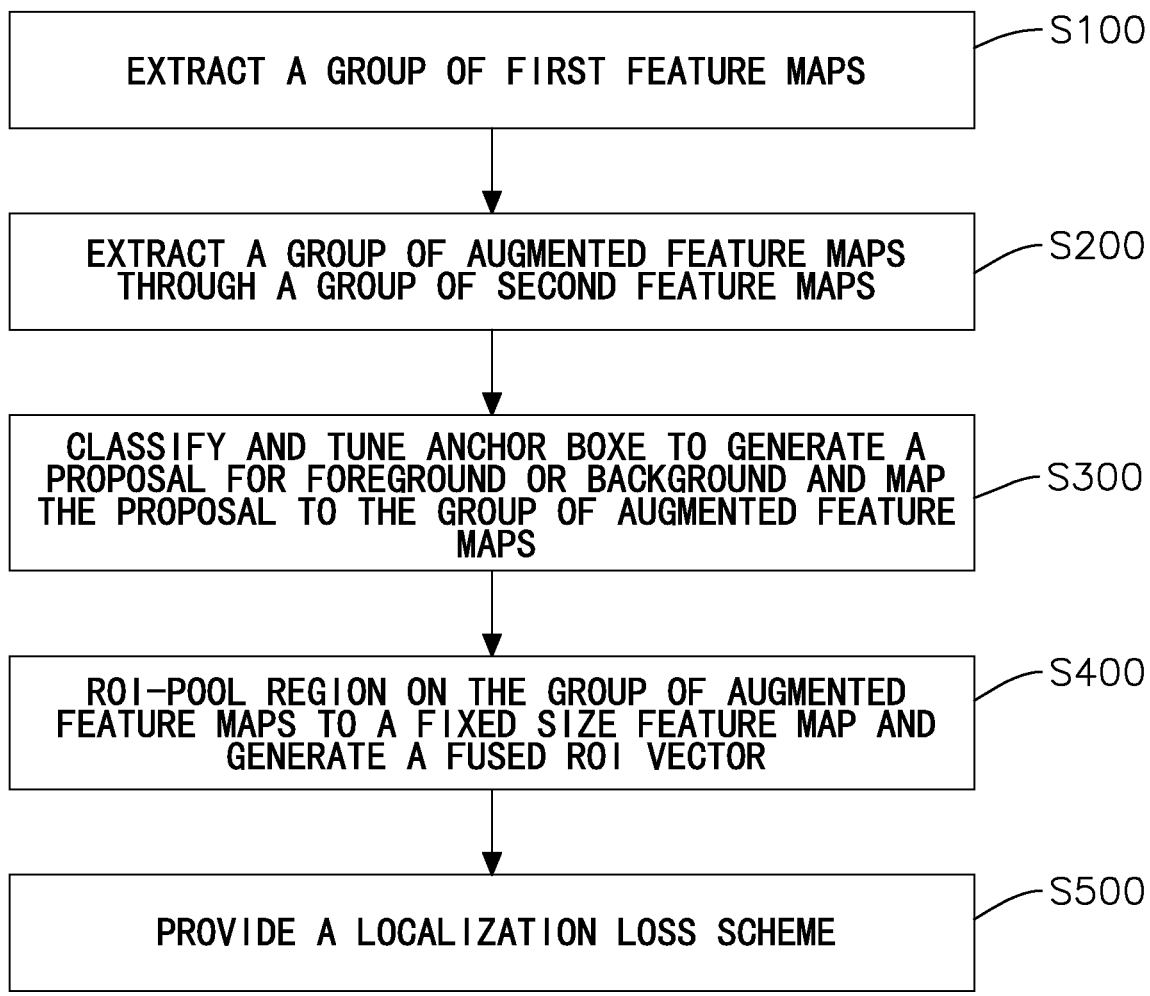
FIG. 7 is a flow diagram showing an object detection method in accordance with the present invention.

An object detection method using the foregoing CNN will be introduced hereinafter. In the method, to avoid duplicating description of features already explored earlier, only some key features are stressed here. With reference to FIG. 7, an object detection method using the foregoing CNN is shown when the CNN is trained during forward propagation and includes the following steps.

Step S100: Extract a group of first feature maps from an input image through a feature extractor. The group of first feature maps are divided into multiple groups of first feature maps that are multi-scale. Each sub-group of first feature maps are equal in scale. Basically, the smaller the sub-group of first feature maps are, the less spatial features and the more semantic features they contain. On the contrary, the larger the sub-groups of first feature maps are, the more spatial features and the less semantic features they contain. In one embodiment, there are four sub-groups of first feature maps, the input image is a bone marrow smear, and the feature extractor may be but not limited to ResNext 101.

Step 200: Propagate features from the group of first feature maps to generate a group of augmented feature maps through a group of second feature maps by scaling and adding corresponding portions of the groups of first, second and augmented feature maps. The groups of second feature maps and augmented feature maps are multi-scale and are identical to the group of first feature maps in width and height. The current step which lays the foundation of making both spatial features and semantic features available in the group of augmented feature maps pursues for augmented feature extraction from the group of first feature maps through the group of second feature maps. To answer that call, the group of augmented feature maps intend to collect features, which are passed from the group of first feature maps, are originally extracted by the feature extractor 10, and are transferred through the sub-group of second feature maps, in a comprehensive manner with features transferred from all portions of the group of first feature maps. More steps will come up later to implement the details of the step S200.

Step 300: Classify and tune each of multiple anchor boxes bounding at least one ground-truth object on the input image to generate a corresponding proposal for foreground or classifying the anchor box bounding no ground-truth object on the input image to generate a corresponding proposal for background, and map the corresponding proposal for foreground to a region on each feature map of the group of augmented feature maps through a region proposal module. The current step primarily aims at generating the proposals for foreground and background and mapping the proposals to corresponding regions on the group of augmented feature maps. In one embodiment, the at least one ground-truth object in the input image 90, a view of a bone marrow smear, includes multiple ground-truth objects. Each of the multiple ground-truth objects in the input image of bone marrow smear is classified into one of 14 types of cells, namely, blast, promyelocyte, myelocyte, metamyelocyte, polymorphonuclear (PMN) cell, eosinophil-and-precursor, basophil, monocyte-and-precursor, lymphocyte, plasma-cell, erythroid cell, histiocyte, mitotic cell, and other cell. A bone marrow examination using the 14 types of cells model for cell classification is sufficient for basic pathologic analysis of samples of bone marrow. To perform advanced pathologic analysis of bone marrow associated with specific bone marrow disorders, each of the multiple ground-truth objects in the input image of bone marrow smear needs to be classified into one of 33 types of cells, namely, blast, promyelocyte, myelocyte, metamyelocyte, neutrophilic-band, segmented-neutrophil, eosinophil-and-precursor, basophil, cell with Auer rods, dysplastic-granulocyte, monocyte-and-precursor, mature-lymphocyte, atypical-lymphocyte, plasma cell, hairy cell, proerythroblast, basophilic-erythroblast, polychromatophilic-erythroblast, orthochromatic-erythroblast, dysplastic-erythroblast, histiocyte, mast cell, megakaryocyte-precursor, mature-megakaryocyte, dysplastic-megakaryocyte, mitotic cell, osteoblast, osteoclast, fibroblast, megakaryocytic emperipolesis, hemophagocytic cell, metastatic-tumor cell, and invalid cell. The invalid cell type of cells includes smudge cell, cell with poor smear quality, and unknown.

Step 400: Pool a region on each feature map of the group of augmented feature maps mapped from each of multiple proposals on the input image to a fixed size feature map, flatten the fixed size feature map to generate an ROI feature vector, and fuse the ROI feature vectors generated from the group of augmented feature maps to generate a fused ROI vector through the ROI aligner for object classification and anchor box regression. A highlighted point in the current step resides in the use of an ROI-aligning scheme that pools the mapped regions on the group of augmented feature maps to the corresponding fixed size feature maps in an accurate fashion.

Figure 8:
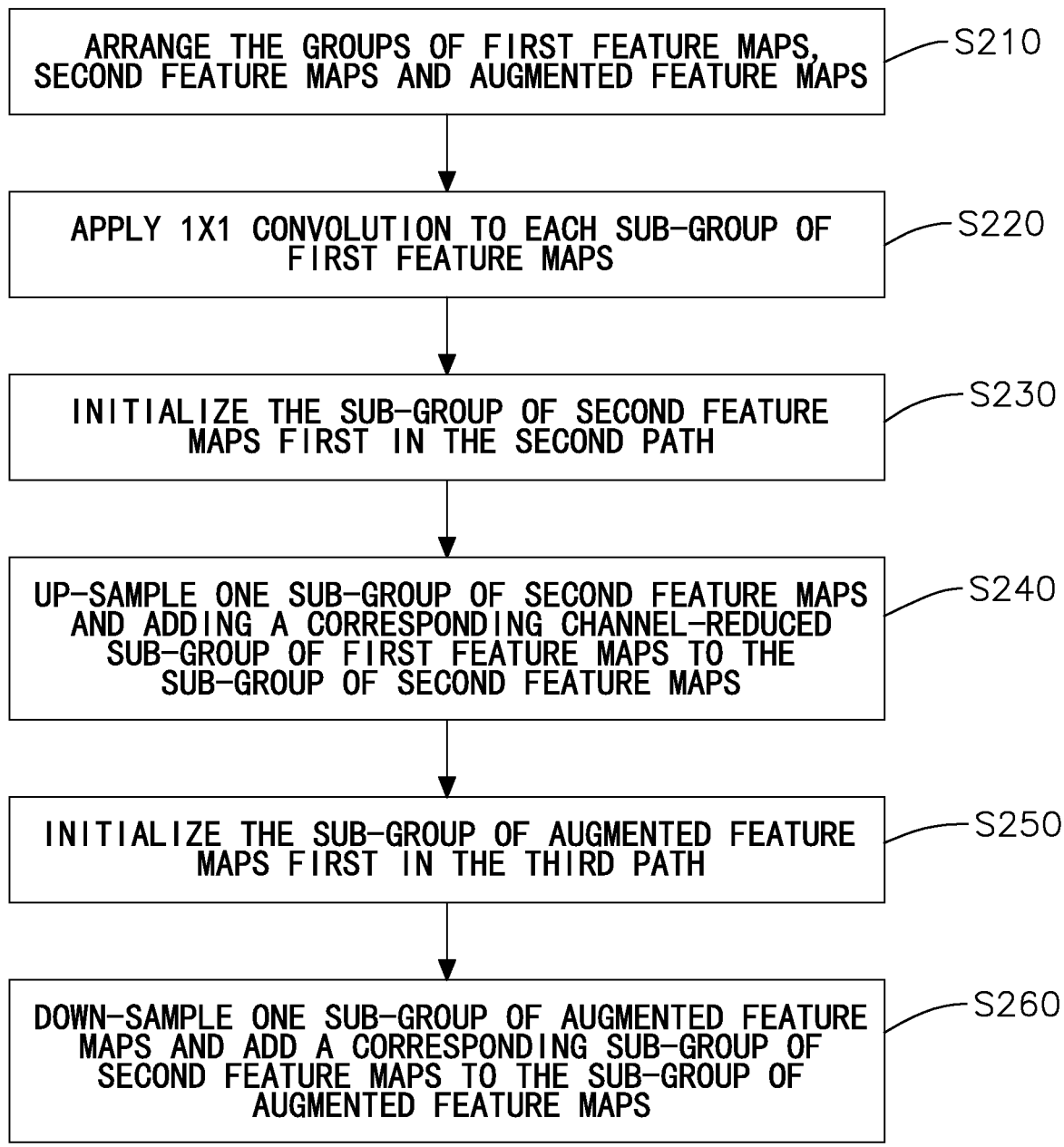
FIG. 8 is a flow diagram showing feature-extracting steps for the method in FIG. 7.

Specifically, with reference to FIG. 8, when going one step further, the step S200 further includes the following steps.

Step S210: Arrange the groups of first feature maps, second feature maps and augmented feature maps respectively on a first path, a second path and a third path sequentially located on a direction of forward propagation. The group of first feature maps, the group of second feature maps, and the group of augmented feature maps include an equal number of sub-groups. As far as the scales among the groups of first, second and augmented feature maps are concerned, each sub-group of first feature maps, a corresponding sub-group of second feature maps, and a corresponding sub-group of augmented feature maps are identical in width and height, and the corresponding sub-groups of second and augmented feature maps are identical in channel. Each sub-group of second feature maps and a corresponding sub-group of augmented feature maps are identical in channel. As to the scales of the sub-groups of first feature maps, the sub-groups of first feature maps decrease in scale along the first path.

Step S220: Apply 1×1 convolution to each sub-group of first feature maps to generate a channel-reduced sub-group of first feature maps having a smallest channel among the sub-groups of first feature maps and propagate the channel-reduced sub-group of first feature maps to the second path. Because the sub-groups of first feature maps are of different channels and any large channel number therein, if any, inevitably leads to heavy computation load, the 1×1 convolution serves to reduce the number of channel in each sub-group of first feature maps down to the smallest channel among the sub-groups of first feature maps to significantly lower subsequent computation overhead in generation of a corresponding channel-reduced sub-group of first feature maps. As a comparison, all the channel-reduced sub-groups of feature maps are exactly the same as the sub-groups of first feature maps in scale except that all the channel-reduced sub-groups of feature maps have an identical channel which is equal to the smallest channel of the sub-groups of first feature maps while the sub-groups of first feature maps vary with each other in number of channel.

Step S230: Initialize the sub-group of second feature maps first in the second path to the channel-reduced sub-group of first feature maps smallest in scale relative to other channel-reduced sub-groups of first feature maps in the second path. It turns out that the sub-group of second feature maps first in the second path is initialized to the channel-reduced sub-group of first feature maps propagated to the second path and originating from the sub-group of first feature maps last in the first path.

Step S240: Up-sample each sub-group of second feature maps except the sub-group of second feature maps last in the second path by an up-sampling factor to match the channel-reduced sub-group of first feature maps being larger than and nearest thereto in scale and add the up-sampled sub-group of second feature maps to the channel-reduced sub-group of first feature maps with a matching scale to generate a subsequent sub-group of second feature maps in the second path. After the current step is completed, it winds up with the sub-groups of second feature maps increasing in scale along the second path and the sub-group of second feature maps last in the second path being the largest in scale in the second path. The up-sampling factor varies depending on a ratio of the width or height of the sub-group of first feature maps to be added to that of the sub-group of second feature maps to be up-sampled.

Step S250: Initialize the sub-group of augmented feature maps first in the third path to the sub-group of second feature maps largest in scale relative to other sub-groups of second feature maps in the second path. It turns out that the sub-group of augmented feature maps first in the third path is initialized to the sub-group of second feature maps propagated to the third path and originating from the sub-group of second feature maps last in the second path.

Step S260: Down-sample each sub-group of augmented feature maps except the sub-group of augmented feature maps last in the third path by a down-sampling factor to match the sub-group of second feature maps being smaller than and nearest thereto in scale and adding the down-sampled sub-group of augmented feature maps to the sub-group of second feature maps with a matching scale to generate a subsequent sub-group of augmented feature maps. After the current step is completed, it winds up with the sub-groups of augmented feature maps decreasing in scale along the third path and the sub-group of augmented feature maps last in the second path being smallest in scale in the third path. The down-sampling factor varies depending on a ratio of the width or height of the sub-group of second feature maps to be added to that of the sub-group of augmented feature maps to be down-sampled.

For each group of first feature maps, second feature maps and augmented feature maps, there may be four sub-groups but not limited thereto. To be specific about the scales, the sub-groups of first feature maps may be but are not limited to be double in scale of a next sub-group of first feature maps, if any.

Varying in a reverse way, the sub-groups of second feature maps increase in scale along the second path and may be but not limited to be one half in scale of a next sub-group of first feature maps, if any. Furthermore, the sub-groups of augmented feature maps decrease in scale along the third path and may be but not limited to be double in scale of a next sub-group of augmented feature maps, if any. The factor for the up-sampling and down-sampling may be 2 in response to the foregoing embodiments for scales but not limited thereto.

Figure 9:
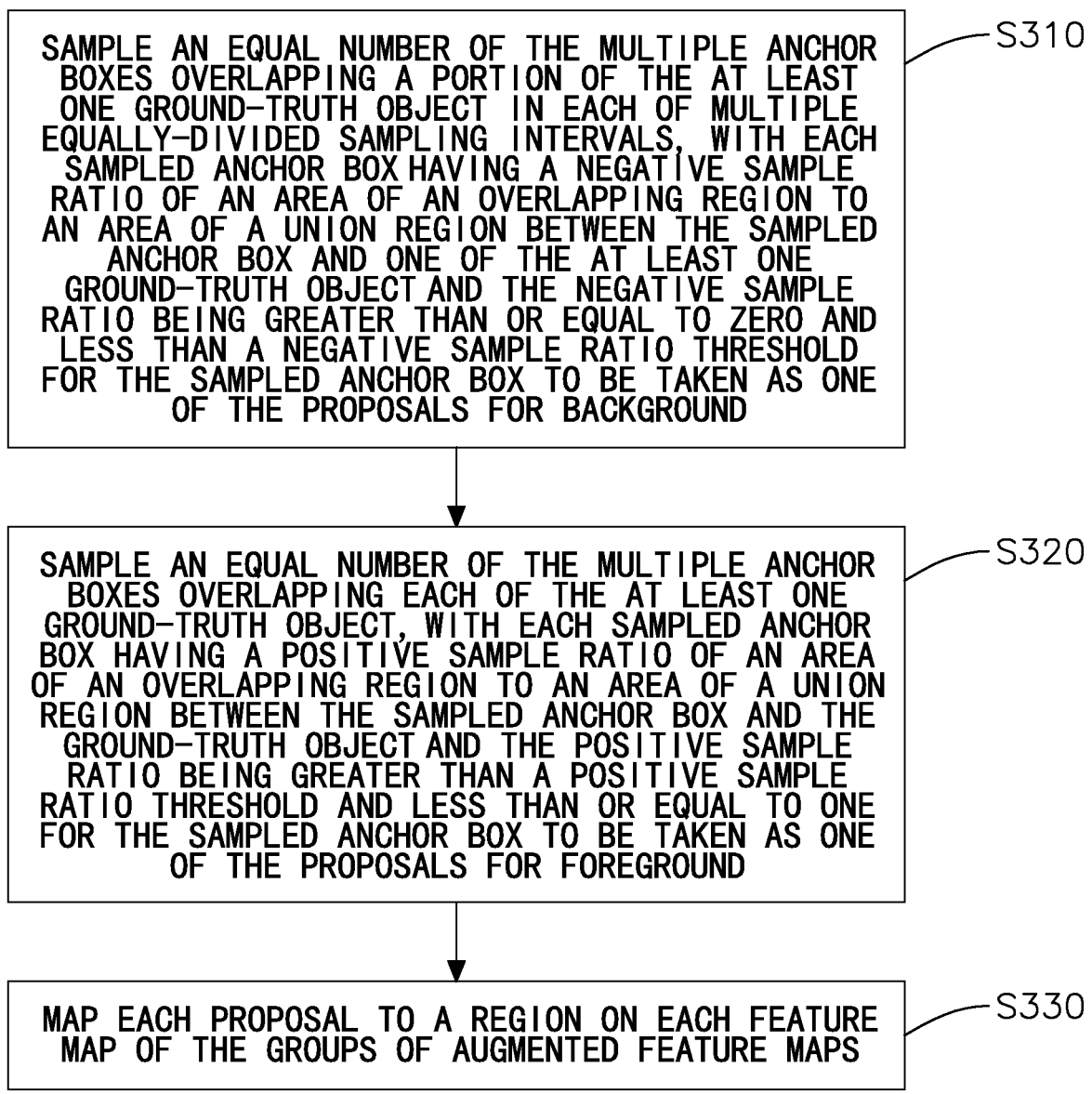
FIG. 9 is a flow diagram showing proposal-sampling steps for the method in FIG. 7.

With reference to FIG. 9, for in-depth understanding, step S300 further includes the following steps.

Step S310: Sample an equal number of the multiple anchor boxes overlapping a portion of the at least one ground-truth object in each of multiple equally-divided sampling intervals, with each sampled anchor box having a negative sample ratio of an area of an overlapping region to an area of a union region between the sampled anchor box and one of the at least one ground-truth object and the negative sample ratio being greater than or equal to zero and less than a negative sample ratio threshold for the sampled anchor box to be taken as one of the proposals for background through the proposal-sampling classifier. The ratios here can be made available by one of generalized IOU algorithm and dice coefficient algorithm. When the generalized IOU algorithm is applied, the negative sample ratio range is a negative IOU range, the negative sample ratio threshold is a negative IOU threshold. In light of the discussion earlier for the proposal-sampling classifier adopting the generalized IOU algorithm, the current step targets at increasing the proposals for background to alleviate the drawbacks of excessive negative samples at zero IOU value and less hard negative samples arising from random sampling. Besides, the negative IOU threshold is 0.3 in one embodiment.

Step S320: Sample an equal number of the multiple anchor boxes overlapping each of the at least one ground-truth object, with each sampled anchor box having a positive sample ratio of an area of an overlapping region to an area of a union region between the sampled anchor box and the ground-truth object and the positive sample ratio being greater than a positive sample ratio threshold and less than or equal to one for the sampled anchor box to be taken as one of the proposals for foreground through the proposal-sampling classifier. In consideration of balanced sampling for positive samples as well, the current step employs a somewhat different way adaptive to scarce number of positive samples available in input images to sample a number of positive samples for each ground-truth object. As can be seen from step S310 and S320, the proposal-sampling classifier enhances a part of jobs of the region proposal module in terms of sampling proposals based on the generalized IOU algorithm or the dice coefficient algorithm to ensure enhanced and balanced sampling for positive and negative proposals.

Step S330: Map each proposal to a region on each feature map of the groups of augmented feature maps through the region proposal module. The current step is performed by the region proposal module to map the proposals for foreground and background sampled by the proposal-sampling classifier to the groups of augmented feature maps.

With further reference to FIG. 7, when the CNN is trained during backpropagation, the object detection method further includes the following step.

Step S500: Provide a localization loss scheme for each of inliers to have a regression gradient higher than that of the inlier acquired based on a linear regression scheme defined by a loss function to minimize errors between predicted values and targeted values when a localization loss of the inlier is less than one and for each of outliers to have a constant regression gradient when the localization loss of the outlier is more than or equal to one. The loss function may be but is not limited to one of standard L1 loss, smooth L1 loss and L2 loss. To deal with object classification and box regression at the same time, the loss function is ideally a combined loss including a classification loss and a localization loss. The classification loss is associated with a difference between a predicted value of a proposal and its target value of a ground-truth object while the localization loss is related to a distance between coordinates for a predicted anchor box of a proposal and a ground-truth object bounded by the anchor box. In the current step, our discussion is within the scope of the localization loss. By definition, the aforementioned inliers are the proposals with a localization loss less than one, and the outliers are the proposals with the localization loss greater than or equal to one. For benchmarking purpose, the smooth L1 loss scheme is selected as a counterpart. In the smooth L1 loss scheme, the regression gradients of the inliers are linearly proportional to the localization loss of the inliers with a proportionality constant being one, and the regression gradients of the outliers are equal to a constant. The outliers can be regarded as hard samples, such as proposals overlapping ground-truth objects with IOU values under 0.5, and will result in huge regression gradients that is detrimental to the training of the CNN. The inliers can be regarded as easy samples, such as proposals overlapping ground-truth objects with IOU values 0 or 1 and only contribute 30% regression gradients in average to overall regression gradients compared with the outliers. To balance the regression gradients provided by the inliers and outliers, a solution to the issue is to promote the regression gradients from the inliers while suppressing the regression gradients from the outliers or keeping them as a constant. In one embodiment, the localization loss scheme is a balanced L1 loss scheme having a regression gradient equation defined as follows:

$$\frac{\partial L_b}{\partial x} = \begin{cases} \alpha \ln(b|x|+1) & \text{if } |x| < 1 \\ \gamma & \text{otherwise} \end{cases} \quad (2)$$

where
x is the regression loss of a proposal;
$L_b$ is the localization loss of the proposal;

$$\frac{\partial L_b}{\partial x}$$

is the regression gradient of the proposal.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An object detection method using a convolution neural network (CNN), comprising:
   (a) extracting a group of first feature maps from an input image through a feature extractor, wherein the group of first feature maps are multi-scale;
   (b) propagating features from the group of first feature maps to generate a group of augmented feature maps through a group of second feature maps by scaling and adding corresponding portions of the groups of first, second and augmented feature maps, wherein the groups of second feature maps and augmented feature maps are multi-scale and are identical to the group of first feature maps in width and height; and
   (c) pooling a region on each feature map of the group of augmented feature maps mapped from each of multiple proposals on the input image to a fixed size feature map, flattening the fixed size feature map to generate an ROI (Region of Interest) feature vector, and fusing the ROI feature vectors generated from the respective group of augmented feature maps to generate a fused ROI vector through an ROI aligner for object classification and anchor box regression.

2. The method as claimed in claim 1, wherein
the step (b) comprises:
   (b1) arranging the groups of first feature maps, second feature maps and augmented feature maps respectively on a first path, a second path and a third path sequentially located on a direction of forward propagation, wherein the group of first feature maps, the group of second feature maps, and the group of augmented feature maps include an equal number of sub-groups, each sub-group of first feature maps, a corresponding sub-group of second feature maps and a corresponding sub-group of augmented feature maps are identical in width and height, and the corresponding sub-groups of second and augmented feature maps are identical in a number of channels and differ from the sub-group of first feature maps in the number of channels; and
in the step (a), each sub-group of first feature maps are identical in width and height and the sub-groups of first feature maps decrease in scale along the first path.

3. The method as claimed in claim 2, wherein in the step (b) comprises:
   (b2) applying 1×1 convolution to each sub-group of first feature maps to generate a channel-reduced sub-group of first feature maps having a smallest number of channels among the sub-groups of first feature maps and propagating the channel-reduced sub-group of first feature maps to the second path;
   (b3) initializing the sub-group of second feature maps first in the second path to the channel-reduced sub-group of first feature maps smallest in scale relative to other channel-reduced sub-groups of first feature maps in the second path;
   (b4) up-sampling each sub-group of second feature maps except the sub-group of second feature maps last in the second path by an up-sampling factor to match the channel-reduced sub-group of first feature maps being larger than and nearest thereto in scale and adding the up-sampled sub-group of second feature maps to the channel-reduced sub-group of first feature maps with a matching scale to generate a subsequent sub-group of second feature maps in the second path;
   (b5) initializing the sub-group of augmented feature maps first in the third path to the sub-group of second feature maps largest in scale relative to other sub-groups of second feature maps in the second path; and
   (b6) down-sampling each sub-group of augmented feature maps except the sub-group of augmented feature maps last in the third path by a down-sampling factor to match the sub-group of second feature maps being smaller than and nearest thereto in scale and adding the down-sampled sub-group of augmented feature maps to the sub-group of second feature maps with a matching scale to generate a subsequent sub-group of augmented feature maps.

4. The method as claimed in claim 3, wherein both the up-sampling factor and the down-sampling factor are 2, and each subgroup of first feature maps except the sub-group of first feature maps last in the first path decrease one half in scale to a next sub-group of first feature maps in the first path.

5. The method as claimed in claim 2, wherein the smaller the sub-groups of first feature maps are in scale, the more semantic features and the less spatial features the sub-groups of first feature maps have, and the larger the sub-groups of first feature maps are in scale, the less semantic features and the more spatial features the sub-groups of first feature maps have.

6. The method as claimed in claim 2, wherein each sub-group of augmented feature maps contain the features propagating from all the sub-groups of first feature maps.

7. The method as claimed in claim 2, wherein the group of first feature maps include four sub-groups of first feature maps, the group of second feature maps include four sub-groups of second feature maps, and the group of augmented feature maps include four sub-groups of augmented feature maps.

8. The method as claimed in claim 1, wherein in step (c), the region on each feature map of the group of augmented feature maps is pooled based on an ROI-aligning scheme.

9. The method as claimed in claim 8, wherein max pooling is used in the ROI-aligning scheme.

10. The method as claimed in claim 1, wherein between the step (b) and the step (c), the method comprises:
   (d) classifying and tuning each of multiple anchor boxes bounding at least one ground-truth object on the input image to generate a corresponding proposal for foreground or classifying the anchor box bounding no ground-truth object on the input image to generate a corresponding proposal for background, and mapping the corresponding proposal for foreground to a region on each feature map of the group of augmented feature maps through a region proposal module.

11. The method as claimed in claim 10, wherein when the CNN is trained during forward propagation, the step (d) comprises:
   (d1) sampling an equal number of the multiple anchor boxes overlapping a portion of the at least one ground-truth object in each of multiple equally-divided sampling intervals with each sampled anchor box having a negative sample ratio of an area of an overlapping region to an area of a union region between the sampled anchor box and one of the at least one ground-truth object and the negative sample ratio being greater than or equal to zero and less than a negative sample ratio threshold for the sampled anchor box to be taken as one of the proposals for background through a proposal-sampling classifier.

12. The method as claimed in claim 11, wherein the step (d) comprises:
   (d2) sampling an equal number of the multiple anchor boxes overlapping each of the at least one ground-truth object with each sampled anchor box having a positive sample ratio of an area of an overlapping region to an area of a union region between the sampled anchor box and the ground-truth object and the positive sample ratio being greater than a positive sample ratio threshold and less than or equal to one for the sampled anchor box to be taken as one of the proposals for foreground.

13. The method as claimed in claim 12, wherein the positive sample ratio and the negative sample ratio are provided by one of generalized IOU algorithm and Dice coefficient algorithm.

14. The method as claimed in claim 13, wherein the negative sample ratio range is a negative IOU range, the negative sample ratio threshold is a negative IOU threshold, and the negative IOU threshold is 0.3.

15. The method as claimed in claim 13, wherein the positive sample ratio threshold is a positive IOU threshold, and the positive IOU threshold is 0.7.

16. The method as claimed in claim 10, wherein the input image is a bone marrow smear, and each of the at least one ground-truth object in the input image is classified into one of blast, promyelocyte, myelocyte, metamyelocyte, polymorphonuclear (PMN) cell, eosinophil-and-precursor, basophil, monocyte-and-precursor, lymphocyte, plasma-cell, erythroid cell, histiocyte, mitotic cell, and other cell.

17. The method as claimed in claim 10, wherein the input image is a bone marrow smear, and each of the at least one ground-truth object in the input image is classified into one of blast, promyelocyte, myelocyte, metamyelocyte, neutrophilic-band, segmented-neutrophil, eosinophil-and-precursor, basophil, cell with Auer rods, dysplastic-granulocyte, monocyte-and-precursor, mature-lymphocyte, atypical-lymphocyte, plasma cell, hairy cell, proerythroblast, basophilic-erythroblast, polychromatophilic-erythroblast, orthochromatic-erythroblast, dysplastic-erythroblast, histiocyte, mast cell, megakaryocyte-precursor, mature-megakaryocyte, dysplastic-megakaryocyte, mitotic cell, osteoblast, osteoclast, fibroblast, megakaryocytic emperipolesis, hemophagocytic cell, metastatic-tumor cell, and invalid cell.

18. The method as claimed in claim 1, wherein when the CNN is trained during back-propagation, the method comprises:
   providing a localization loss scheme for each of inliers to have a regression gradient higher than that of the inlier acquired based on a linear regression scheme defined by a loss function to minimize errors between predicated values and targeted values and for each of outliers to have a constant regression gradient;
   wherein the inliers are defined to be the proposals with a localization loss less than one, the outliers are defined to be the proposals with the localization loss greater than or equal to one; in the loss function, the regression gradient of the inliers is linearly proportional to the localization loss with a proportionality constant being one and the regression gradient of the outliers is equal to a constant.

19. The method as claimed in claim 18, wherein the loss function is one of standard L1 loss, smooth L1 loss and L2 loss.

20. The method as claimed in claim 18, wherein the localization loss scheme is a balanced L1 loss scheme having a regression gradient equation defined by:

$$\frac{\partial L_b}{\partial x} = \begin{cases} \alpha \ln(b|x| + 1) & \text{if } |x| < 1 \\ \gamma & \text{otherwise} \end{cases}$$

where
x is the regression loss of a proposal;
$L_b$ is the localization loss of the proposal;

$$\frac{\partial L_b}{\partial x}$$

is the regression gradient of the proposal.

21. A convolution neural network (CNN) for object detection, comprising:

a feature extractor including multiple convolution layers, receiving an input image, and extracting features from the input image to generate multiple groups of feature maps, wherein the multiple groups of feature maps include a group of first feature maps, a group of second feature maps, and a group of augmented feature maps that contain equal number of sub-groups, each group of feature maps are multi-scale and corresponding sub-groups of feature maps in the multiple groups of feature maps are equal in scale, and features extracted from the group of first feature maps are propagated to generate the group of augmented feature maps through the group of second feature maps by scaling and adding corresponding sub-groups of the groups of first, second and augmented feature maps; and an ROI (Region of Interest) aligner pooling a region on each feature map of the group of augmented feature maps mapped from each of multiple proposals on the input image to a fixed size feature map, flattening the fixed size feature map to generate an ROI feature vector, and fusing the ROI feature vectors generated from the groups of augmented feature maps to generate a fused ROI vector for object classification and anchor box regression.

22. The CNN as claimed in claim 21, wherein the groups of first feature maps, second feature maps and augmented feature maps are respectively arranged on a first path, a second path and a third path sequentially located on a direction of forward propagation, the group of first feature maps, the group of second feature maps, and the group of augmented feature maps include an equal number of sub-groups, each sub-group of first feature maps, a corresponding sub-group of second feature maps and a corresponding sub-group of augmented feature maps are identical in width and height, the corresponding sub-groups of second and augmented feature maps are identical in channel and differ from the sub-group of first feature maps in channel, each sub-group of first feature maps are identical in width and height and the sub-groups of first feature maps decrease in scale along the first path.

23. The CNN as claimed in claim 22, wherein
1×1 convolution is applied to each sub-group of first feature maps to generate a channel-reduced sub-group of first feature maps having a smallest channel among the sub-groups of first feature maps and the channel-reduced sub-group of first feature maps is propagated to the second path;

the sub-group of second feature maps first in the second path is initialized to the channel-reduced sub-group of first feature maps lowest in scale relative to other channel-reduced sub-groups of first feature maps in the second path;

each sub-group of second feature maps except the sub-group of second feature maps last in the second path are up-sampled by an up-sampling factor to match the channel-reduced sub-group of first feature maps being larger than and nearest thereto in scale and the up-sampled sub-group of second feature maps are added to the channel-reduced sub-group of first feature maps with a matching scale to generate a subsequent sub-group of second feature maps in the second path;

the sub-group of augmented feature maps first in the third path is initialized to the sub-group of second feature maps largest in scale relative to other sub-groups of second feature maps in the second path; and each sub-group of augmented feature maps except the sub-group of augmented feature maps last in the third path are down-sampled by a down-sampling factor to match the sub-group of second feature maps being smaller than and nearest thereto in scale and the down-sampled sub-group of augmented feature maps are added to the sub-group of second feature maps with a matching scale to generate a subsequent sub-group of augmented feature maps.

24. The CNN as claimed in claim 23, wherein both the up-sampling factor and the down-sampling factor are 2, and each sub-group of first feature maps except the sub-groups of first feature maps last in the first path decrease one half in scale to a next sub-group of first feature maps in the first path.

25. The CNN as claimed in claim 21, comprising a region proposal module classifying and tuning each of multiple anchor boxes bounding at least one ground-truth object on the input image to generate a corresponding proposal for foreground or classifying the anchor box bounding no ground-truth object on the input image to generate a corresponding proposal for background, and mapping the corresponding proposal for foreground to a region on each feature map of the group of augmented feature maps.

26. The CNN as claimed in claim 25, when the CNN is trained during forward propagation, comprising a proposal-sampling classifier, wherein the proposal-sampling classifier samples an equal number of the multiple anchor boxes overlapping a portion of the al least one ground-truth object in each of multiple equally-divided sampling intervals with each sampled anchor box having a negative sample ratio of an area of an overlapping region to an area of a union region between the sampled anchor box and one of the at least one ground-truth object and the negative sample ratio being greater than or equal to zero and less than a negative sample ratio threshold for the sampled anchor box to be taken as one of the proposals for background through a proposal-sampling classifier.

27. The CNN as claimed in claim 26, wherein the proposal-sampling classifier samples an equal number of the multiple anchor boxes overlapping each of the at least one ground-truth object with each sampled anchor box having a positive sample ratio of an area of an overlapping region to an area of a union region between the sampled anchor box and the ground-truth object and the positive sample ratio being greater than a positive sample ratio threshold and less than or equal to one for the sampled anchor box to be taken as one of the proposals for foreground.

28. The CNN as claimed in claim 27, wherein the positive sample ratio and the negative sample ratio are provided by one of generalized IOU algorithm and dice coefficient algorithm.

29. The CNN as claimed in claim 28, wherein the negative sample ratio range is a negative IOU range, the negative sample ratio threshold is a negative IOU threshold, and the negative IOU threshold is 0.3.

30. The CNN as claimed in claim 28, wherein the positive sample ratio threshold is a positive IOU threshold, and the positive IOU threshold is 0.7.

31. The CNN as claimed in claim 25, wherein the ROI aligner comprises:
multiple ROI align layers corresponding to the sub-groups of augmented feature maps in number, and each ROI align layer substantially a pooling layer performing a pooling operation on regions on the feature maps of a corresponding sub-group of augmented feature maps mapped by the region proposal module from each proposal on the input image to generate fixed-scale feature maps;

multiple fully-connected ROI layers corresponding to the sub-groups of augmented feature maps in number, and each fully-connected ROI layer flattening the fixed-scale feature maps generated from a corresponding sub-group of augmented feature maps to generate a ROI feature vector; and a fusion layer fusing the ROI feature vectors flattened by the multiple fully-connected ROI layers to generate a fused ROI vector.

32. The CNN as claimed in claim 25, wherein the input image is a bone marrow smear, and each of the at least one ground-truth object in the input image is classified into one of basophil, blast, eosinophil-and-precursor, erythroid cell, histiocyte, lymphocyte, metamyelocyte, mitotic cell, monocyte-and-precursor, myelocyte, polymorphonuclear (PMN) cell, plasma-cell, promyelocyte, erythroid, and other cell.

33. The CNN as claimed in claim 25, wherein the input image is a bone marrow smear, and each of the at least one ground-truth object in the input image is classified into one of blast, promyelocyte, myelocyte, metamyelocyte, neutrophilic-band, segmented-neutrophil, eosinophil-and-precursor, basophil, cell with Auer rods, dysplastic-granulocyte, monocyte-and-precursor, mature-lymphocyte, atypical-lymphocyte, plasma cell, hairy cell, proerythroblast, basophilic-erythroblast, polychromatophilic-erythroblast, orthochromatic-erythroblast, dysplastic-erythroblast, histiocyte, mast cell, megakaryocyte-precursor, mature-megakaryocyte, dysplastic-megakaryocyte, mitotic cell, osteoblast, osteoclast, fibroblast, megakaryocytic emperipolesis, hemophagocytic cell, metastatic-tumor cell, and invalid cell.

34. The CNN as claimed in claim 21, wherein the ROI aligner pools the region on each feature map of the group of augmented feature maps based on an ROI-aligning scheme.

35. The CNN as claimed in claim 34, wherein the ROI-aligning scheme employs max pooling.

36. The CNN as claimed in claim 21, wherein the smaller the sub-groups of first feature maps are in scale, the more semantic features and the less spatial features the sub-groups of first feature maps have, and the larger the sub-groups of first feature maps are in scale, the less semantic features and the more spatial features the sub-groups of first feature maps have.

37. The CNN as claimed in claim 21, wherein each sub-group of augmented feature maps contain features propagating from all the sub-groups of first feature maps.

38. The CNN as claimed in claim 21, wherein the group of first feature maps include four sub-groups of first feature maps, the group of second feature maps include four groups of second feature maps, and the group of augmented feature maps include four groups of augmented feature maps.

* * * * *